US006931046B1

(12) United States Patent
Ault (10) Patent No.: US 6,931,046 B1
(45) Date of Patent: Aug. 16, 2005

(54) HIGH POWER LASER HAVING A TRIVALENT LIQUID HOST

(75) Inventor: Earl R. Ault, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 683 days.

(21) Appl. No.: 09/661,653

(22) Filed: Sep. 14, 2000

(51) Int. Cl.[7] .............................................. H01S 3/20
(52) U.S. Cl. ........................... 372/51; 372/58; 372/59; 372/61
(58) Field of Search .............................. 372/51, 53, 58, 372/59, 61–65, 90; 252/301.17, 519.12, 520.2

(56) References Cited

U.S. PATENT DOCUMENTS

| 3,663,891 | A | * | 5/1972 | Kocher et al. | 331/94.5 |
|---|---|---|---|---|---|
| 3,688,216 | A | * | 8/1972 | Kocher et al. | 331/94.5 |
| 3,717,825 | A | | 2/1973 | Gerlach | 331/94.5 |
| 3,740,665 | A | | 6/1973 | Itzkan | 331/94.5 |
| 3,779,939 | A | | 12/1973 | Schmitschek et al. | 252/301.4 P |
| 3,805,187 | A | * | 4/1974 | Lempickl et al. | 331/94.5 |
| 3,913,033 | A | * | 10/1975 | Tuccio et al. | 331/94.5 |
| 3,931,594 | A | | 1/1976 | Schafer | 331/94.5 L |
| 4,134,084 | A | * | 1/1979 | Dube | 331/94.5 |
| 4,635,270 | A | * | 1/1987 | Gurs | 372/58 |
| 4,654,855 | A | * | 3/1987 | Chun | 372/58 |
| 4,704,719 | A | * | 11/1987 | Weiss | 372/58 |
| 4,884,277 | A | * | 11/1989 | Anthon et al. | 372/22 |
| 5,142,542 | A | * | 8/1992 | Dixon | 372/22 |
| 5,307,358 | A | * | 4/1994 | Scheps | 372/20 |
| 5,742,627 | A | * | 4/1998 | Morita et al. | 372/34 |
| 6,208,676 | B1 | * | 3/2001 | Hongu | 372/61 |

* cited by examiner

*Primary Examiner*—David Porta
*Assistant Examiner*—Davienne Monbleau
(74) *Attorney, Agent, or Firm*—Eddie E. Scott; Alan H. Thompson (57) ABSTRACT

A laser having a lasing chamber and a semiconductor pumping device with trivalent titanium ions dissolved in a liquid host within the lasing chamber. Since the host is a liquid, it can be removed from the optical cavity when it becomes heated avoiding the inevitable optical distortion and birefringence common to glass and crystal hosts.

5 Claims, 6 Drawing Sheets

HIGH POWER LASER HAVING A TRIVALENT LIQUID HOST

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to lasers, and more particularly to a high power laser with a trivalent titanium liquid host.

2. State of Technology

There are many applications for very high average optical power lasers. These applications include power beaming, laser guide stars, illuminators, material processing, remote sensing, laser weapons, and tactical defense systems. A problem in high power laser applications is the lack of suitable sources of radiation with high beam quality. For weapons applications the Chemical Oxygen Iodine Laser (COIL) seems to show promise, but it is a complex and expensive system for use in the 10–100 kW regime. Also at 1.3 micron, it is not useful for use with solar cells and is not readily frequency converted to short wavelengths as would be required for guide stars. Free electron lasers (FELs) have been touted as a solution for decades but have failed to demonstrate useful output powers and acceptable system efficiencies at the wavelengths of interest. Proposed high efficiency recirculating FELs, in which the beam energy is recovered after exiting the wiggler, have been unimpressive due to the poor emittance of the recovered beam and the resulting energy loss in the accelerator and storage ring. To date FELs have yet to produce multi-kilo watt beams at any wavelength and require an immense physical plant to produce even a few watts in the infrared.

Neodymium and other metal ions embedded in a variety of glassy and crystal hosts have been the mainstay of commercial lasers and fusion lasers for decades. However, when these devices are applied to multi-kilowatt applications results have been disappointing. Despite of the development of many complex and expensive systems, practical operation at much greater than one kilowatt with beams near the diffraction limit has not been demonstrated. This complex problem is essentially an issue of thermal management. Solids must have the heat conducted away and at high heat loads this leads to unavoidable temperature gradients. These gradients destroy optical beam quality and can lead to fracture of the media. To cope with these problems designs have recently been put forward that use reduced crystal thickness to improve heat conduction. This approach has limited excited volume, and a complex optical train must be constructed to give the volume needed to produce high average powers. It is not clear if closure can be reached with these designs, since each added component adds additional optical aberrations and opportunities for catastrophic optical damage.

Fluids, on the other hand, have the advantage that when the media gets hot it can be removed from the optical path to a place where it can be cooled. A liquid laser is shown and described in U.S. Pat. No. 3,717,825 to Carl Zeiss-Stiftung, Wuerttemburg, Federal Republic of Germany, patented Feb. 20, 1973. This patent shows a dyestuff laser provided with a liquid guiding chamber through which circulates a cooled laser liquid. The laser is provided with a U-shaped laser active zone formed by a light transmitting longitudinal cap into which extends a tongue forming in said cap a U-shaped zone of uniform cross section. This U-shaped laser active zone is disposed in a focal line of an elliptically shaped pump light reflector while a source of pump light is disposed in the other focal line.

Fluids do not exhibit birefringence so all polarization options are available, have high optical damage thresholds, and do not permanently damage if the threshold is exceeded. Compared to solid laser media fluids are quite inexpensive. U.S. Pat. No. 3,931,594 to Fritz Peter Schafer, assigned to Max-Planck-Gesellschaft zur Forderung der Wissenschaften e.V., patented Jan. 6, 1976, shows a transverse-flow cell for a laser. The cell of a liquid laser is defined between the rounded, parallel edges four coaxial cylinder sectors of fused quartz. The narrow gaps circumferentially bounded by the flat, converging side faces of the sectors provide conduits for rapid flow of dye liquid into and out of the cell which extend over the full axial length of the cell. The light of a flash tube is directed toward the cell through the cylindrically arcuate outer face of each sector.

U.S. Pat. No. 3,740,665 to Irving Itzkan, assigned to Avco Corporation, patented Jun. 19, 1973, shows a transverse flowing liquid laser. Stimulated emission of radiation (laser action) is produced in materials generally classed as dyes. These dyes are dissolved in a liquid solution. A quantity of dye in a flowing liquid solution in a module or cavity is pumped or excited by a laser beam radiating in the ultraviolet region which is focused to a line with a cylindrical lens. A rectangular cross sectional beam of such radiation is produced by a pulsed crossed field nitrogen gas laser. The focused line which is transverse to the beam produced by the exciting laser, and transverse to the direction of the flowing dye, lies near the surface of the dye material in the cell and is substantially as long as the cell is wide. The cell lies within an intensifying optical cavity which may be formed by a 100 percent reflecting mirror and a partially reflecting mirror both perpendicular to the line of focus of the pumping radiation. The stimulated emission from the dye material is characterized by a short pulse width and a little loss of energy between the two lasers.

One of the most highly developed fluid lasers is the AVLIS dye laser AVLIS (Atomic Vapor Laser Isotope Separation). Development of this family of lasers took place at Lawrence Livermore National Laboratory over the period of 1972 to 1999. It can produce single aperture powers approaching 3 kW with nearly diffraction limited beams. However, these lasers do not store optical energy and must be excited by an even higher peak power pump laser, albeit with much lower beam quality requirements. Rare earth ion based lasers have the advantage of long florescent lifetimes, so they require lower peak pump powers.

Liquid hosts containing rare earth have been considered. However, such devices were flash lamp driven leading to unacceptably large temperature gradients in the fluid and their poor beam quality. U.S. Pat. No. 3,779,939 to Erhard J. Schmitschek et al., assigned The United States of America as represented by the Secretary of the Navy, patented Dec. 18, 1973, shows a liquid lasing composition consisting essentially of neodymium (III) phosphorus dichloridate, retained in solution with phosphorus oxychloride by the addition of a Lewis acid.

SUMMARY OF THE INVENTION

In accordance with the present invention, a laser system is provided that will produce high optical power with high beam quality. The present invention utilizes trivalent titanium ions dissolved in a liquid host to provide powerful laser action in the 800 to 900 nm region.

It has been proposed to use liquid lasers based on $Nd^{+3}$ ions. However, at the lasing wavelength of 1.053 micron, solar cells, one of the primary receivers of such radiation, are limited to those based on silicon. Moreover, radiation damaged silicon cells and gallium arsenide cells perform poorly at this wevelength. What is needed is the equivalent of a Ti:Sapphire solid state laser that is in the liquid state that can be pumped with presently available semiconductor diodes at around 800 nm. The present invention utilizing trivalent titanium ions dissolved in a liquid host provides the answer.

In an embodiment of the present invention a $Ti^{+3}$ bases liquid is optically excited by a semiconductor diode. Since the host is a liquid, it can be removed from the optical cavity when it becomes heated avoiding the inevitable optical distortion and birefringence common to glass and crystal hosts. The $Ti^{+3}$ bases liquid laser, operating in the near infrared at 800–900 nm, is capable of producing tens of kilowatts of cw power with good beam quality. Applications include power beaming, laser guide stars, illuminators, material processing, remote sensing, laser weapons, and tactical defense systems.

Additional aspects, advantages, and features of the invention are set forth in part in the following description. Various aspects, advantages, and features of the invention will become apparent to those skilled in the art upon examination of the description and by practice of the invention.

DETAILED DESCRIPTION OF THE INVENTION

There are many applications for high power lasers. These applications include power beaming, laser guide stars, illuminators, material processing, remote sensing, laser weapons, and tactical defense systems. In power beaming, laser radiation is transported to a remote location where it is converted to electrical power or for other uses such as propulsion. Tens to hundreds of kilowatts of laser light with sufficient beam quality are required for the applications of interest. The wavelength requirements of the receiver as well as the transparency of the atmosphere are prime considerations.

Power beaming using high power lasers to the lunar surface to support a colony has been considered. Power beaming to satellites at Geosynchronous Earth Orbit (GEO) has been considered. The uses of power beaming to GEO include battery charging, space tugs to change orbit, and for primary power to increase the transponder capacity. NASA has initiated a program involving a high altitude aircraft powered by solar power for the purpose of Environmental Research and Sensor Technology (ERAST). In transmitting power from earth to the high altitude aircraft, a photovoltaic (PV) cell array is located on the underside of the high altitude aircraft to be accessible from laser radiation from the earth. The PV cell array is mounted on a part of the high altitude aircraft which is also transparent to solar radiation from above. The PV cells are sufficiently thin so that solar radiation can also contribute to the power conversion; and in case of interruption of the laser power beaming, the solar radiation can provide backup power.

Figure 1:
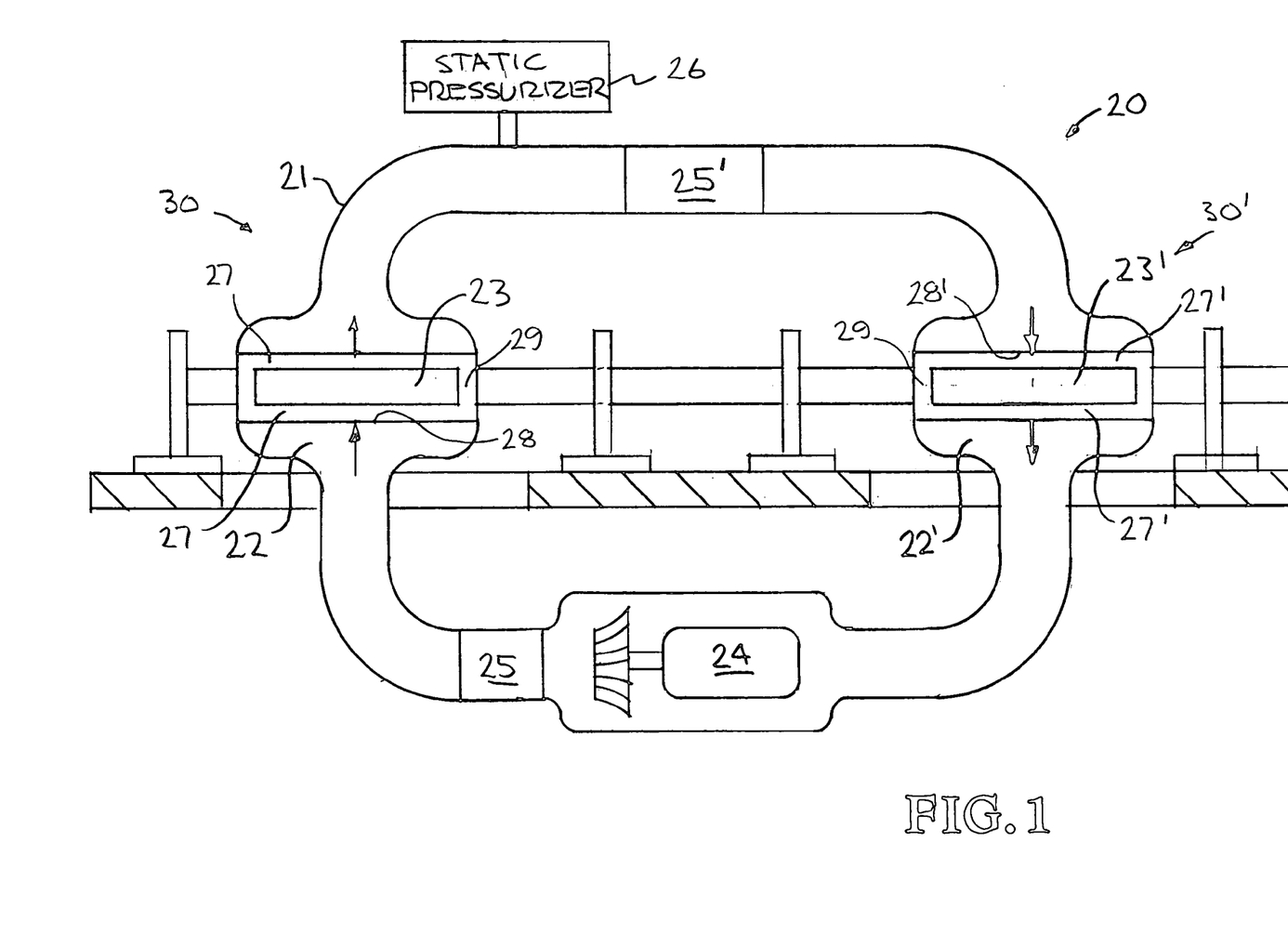
FIG. 1 illustrates an embodiment of a laser constructed in accordance with the present invention.

Referring now to the drawings and in particular to FIG. 1, an embodiment of a laser constructed in accordance with the present invention is illustrated. The laser system is generally designated by the reference numeral 20. A liquid lasing medium is circulated through a closed loop. The closed loop is generally designated by the reference numeral 21. The closed loop 21, filled with a $Ti^{+3}$ bases liquid, circulates the liquid into and out of a pair of lasing chambers 22 and 22'. A pair of semiconductor pumping devices 23 and 23' are located within the lasing chambers 22 and 22'. The semiconductor pumping devices 23 and 23' are used to optically excite the liquid lasing medium within the optical cavities, lasing chambers 22 and 22'. The semiconductor pumping devices 23 and 23' can be a semiconductor diode lasers or light emitting diodes. The pump 24 circulates the lasing liquid through a pair of heat exchangers/flow conditioners 25 and 25', a static pressurizer 26, and the optical cavities 22 and 22'.

Windows 27 and 27' at each end of the channel, channels 28 and 28', define excitation volumes. The excitation volumes and semiconductor pumping devices 23 and 23' provide two gain blocks 29 and 29'. The two gain blocks 29 and 29' with opposite flow directions are used to compensate for the static optical wedge induced by fluid heating. The linear component, or optical wedge, that builds up in the liquid as it flows past the pump windows is predictable and steady. The lasing chambers 22 and 22' and gain blocks 29 and 29' provide two cells 30 and 30'. By arranging the two cells 30 and 30' in series in the laser cavity having opposite flow directions allows the wedge to be canceled.

The present invention utilizes trivalent titanium ions dissolved in a liquid host. The shifts in absorption and emission seen when this ion is placed in glasses demonstrate it is possible to achieve powerful laser action in the 800 to 900 nm region when this ion is excited by 808 nm semiconductor diodes. Solar cells are one of the primary receivers of such radiation at 1.053 micron. What is needed is the equivalent of a Ti:Sapphire solid state laser that is in the liquid state that can be pumped with presently available semiconductor diodes at around 800 nm. The present invention utilizing trivalent titanium ions dissolved in a liquid host provides the answer.

Figure 2:
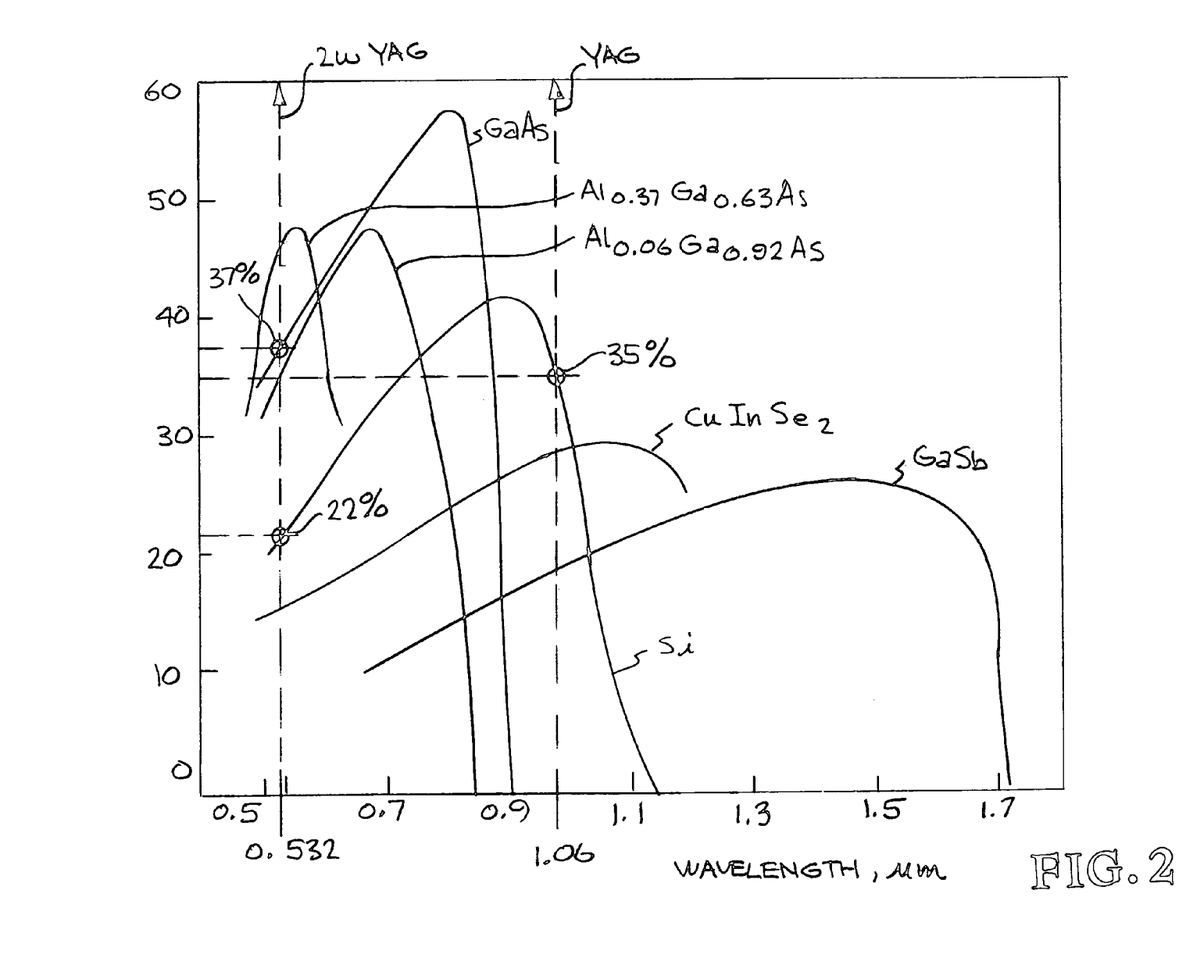
FIG. 2 shows the conversion efficiency of several solar cell materials as a function of illumination wavelength.

The conversion efficiency of several solar cell materials as a function of illumination wavelength is show in FIG. 2. This graph is based on work done by Anspaugh, Mueller, Lowe, and Landis at NASA-JPL (*Results of Illuminating Various Solar Cells with Pulsed Laser Beams*, Anspaugh, Mueller, Lowe, and Landis, NASA-JPL Publication 92-25.) What is needed for this application is a powerful cw laser with a wavelength less than 900 nm. Furthermore, it is very desirable for this laser to be pumped with semiconductor diodes for efficiency and thermal management reasons. A liquid host is preferred. Nearly all lasers in this part of the spectrum are solid state lasers with the exception of near infrared dye lasers.

Trivalent transition metals have been studied in crystals and glasses. Trivalent chromium, being an example, performs well in a number of hosts. The requirement of relatively short pump wavelengths (in the 600 to 700 nm range) makes diode pumping possible but difficult because of the lower level of development of efficient high power semiconductor diode bars in this spectral region. The three level $Cr^{+3}$ laser also requires high pump intensities in spite of the long fluorescent lifetime (~3 ms in ruby for example). Trivalent chromium in glasses shows broad emission and absorption peaks shifted to the red of ruby and may possibly act more like a four level system and therefore be easier to drive to threshold. The center emission wavelength is quite sensitive to host composition, but operation at 1000 nm is shown with a 200 nm half width for the Silicate formulation. However, the peak absorption lies at 650 nm and is weak at 800 nm.

The optical properties of $Ti^{+3}$ in glasses was promising. Under these conditions, Titanium offers reasonable absorption near 800 nm and strong emission from 800 nm to over 900 nm. By correspondence, since aprotic liquids can host complexed $Nd^{+3}$ ions and yield laser performance very similar to glasses, it is considered possible to maintain $Ti^{+3}$ in a liquid laser solution.

Aprotic liquid $Nd^{+3}$ lasers behave spectrally and kinetically very much like a glass laser, but the medium can flow for cooling. Stark broadening of the ion spectra to allow the laser transitions occurs in the disordered liquid by virtue of solvophilic ligands (such as $GaCl_3$, $SnCl_4$, etc.) forming complexes with the target metal ion. This process is analogous to the splitting caused by the disordered local fields arising in the vicinity of the ion imbedded in glass.

Interest in glasses stems from the close analogy to liquids. Of interest here is the fact that the glass matrix gives rise to a significant broadening of the absorption band and shifts in the absorption peak and emission peak compared to a Sapphire matrix so that diode pumping at 808 nm may be possible, see FIGS. 3A, 3B, 3C, and 3D for comparisons.

Figure 3A:
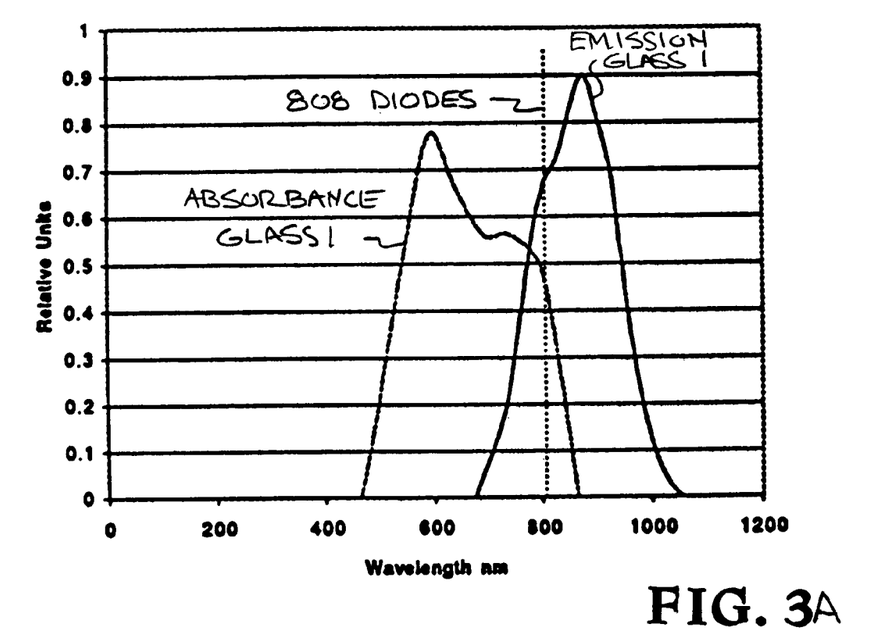
FIG. 3A shows Glass I Al(PO3):$Ti^{+3}$.
Figure 3B:
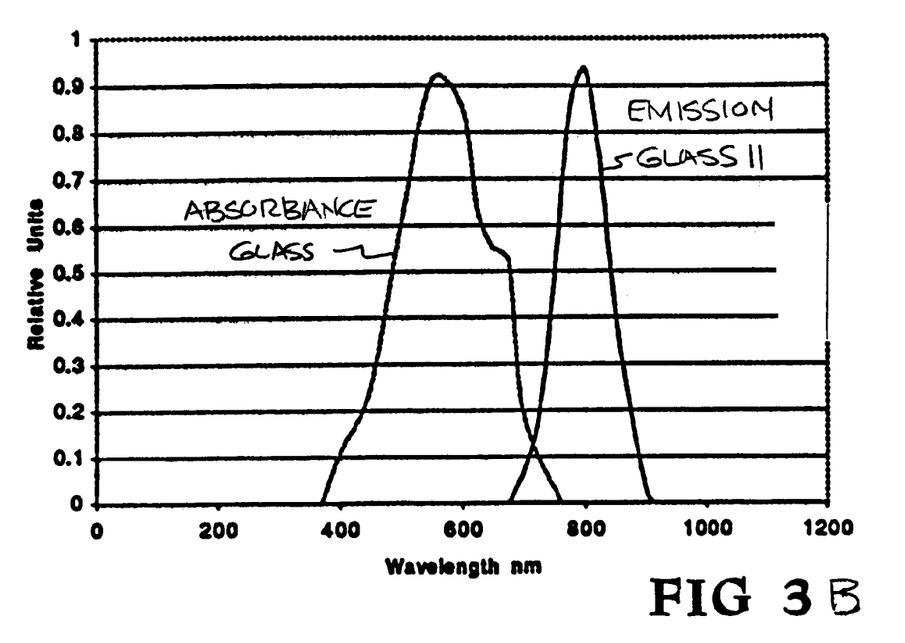
FIG. 3B shows Glass II Al(PO3):$Ti^{+3}$.
Figure 3C:
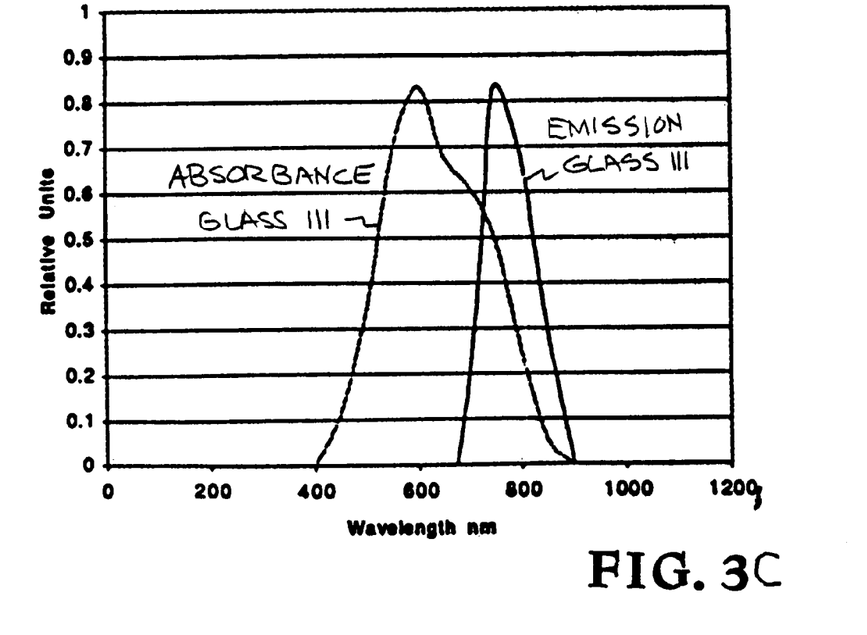
FIG. 3C shows Glass III Gallium Phosphate.
Figure 3D:
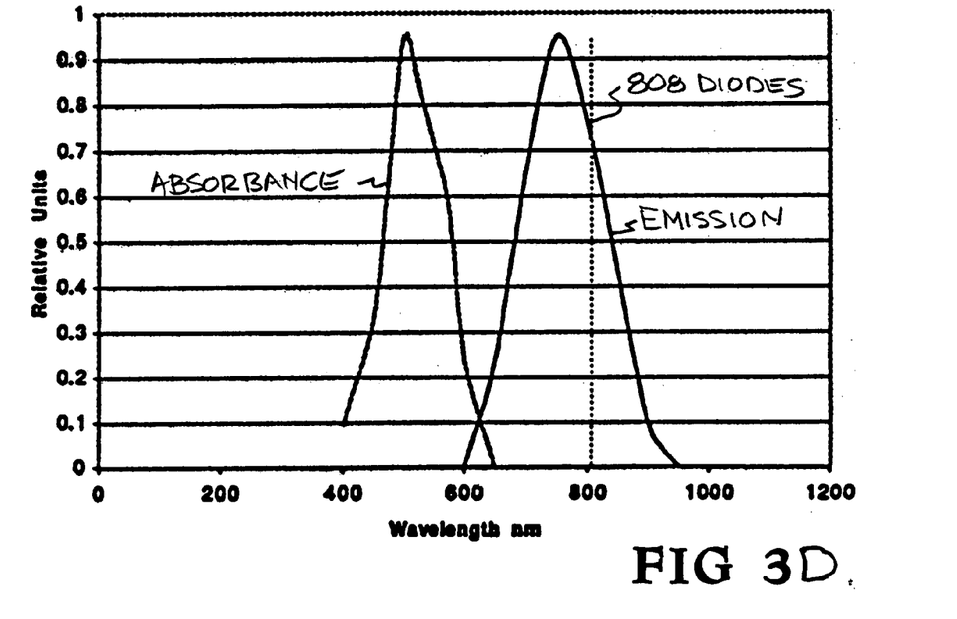
FIG. 3D shows Ti:Sapphire.

FIG. 3A, showing Glass I $Al(PO3):Ti^{+3}$, is very attractive for 808 nm diode pumping and lasing at 900 nm. Other formulations have Glass II shown in FIG. 3B which is reminiscent of Ti:Sapphire, shown in FIG. 3D. FIG. 3C is shifted too far to the blue and is actually worse than Ti:Sapphire. Excited state lifetimes are also improved in the glasses compared to corundum. It is established that glass hosts for $Ti^{+3}$ offer the possibility of laser action. The interest in glass is as a model for possible liquid hosts.

There are three considerations in choosing a liquid host. First there must be sufficient Stark splitting from the solvating ligand to make the ion optically active. This is the case in the aprotic Nd systems. Next, the liquid must not quench the excited state of the ion. As we have seen with Nd, hydrogen bonds are effective in quenching the laser upper level forcing the use of inorganic solvents. Finally, the solution must probably be acidic to preserve the valence of the ion. Lewis acids are the likely medium. Most solvents explored for use in liquid lasers are based on halides or oxychlorides and employ sulfur or phosphorus as the anion in the +6 valence state. The exception is thionyl chloride where sulfur is in the +4 state. In the case of $Ti^{+3}$, $Mn^{+3}$, and $UO_2Cl_2$, thionyl chloride is unsuitable because it can change valence and reduce $Ti^{+3}$ to $Ti^{+4}$.

Figure 4A:
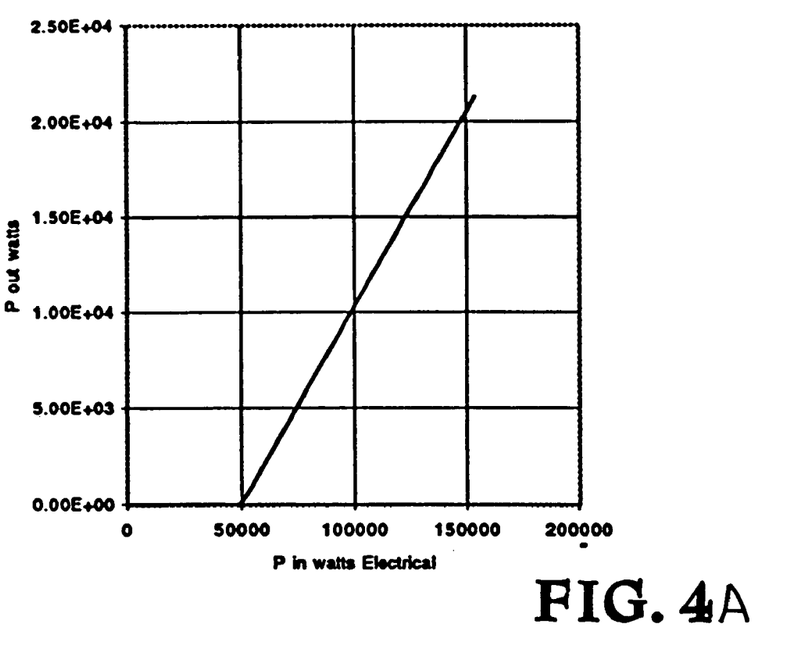
FIG. 4A is a graph of laser performance.
Figure 4B:
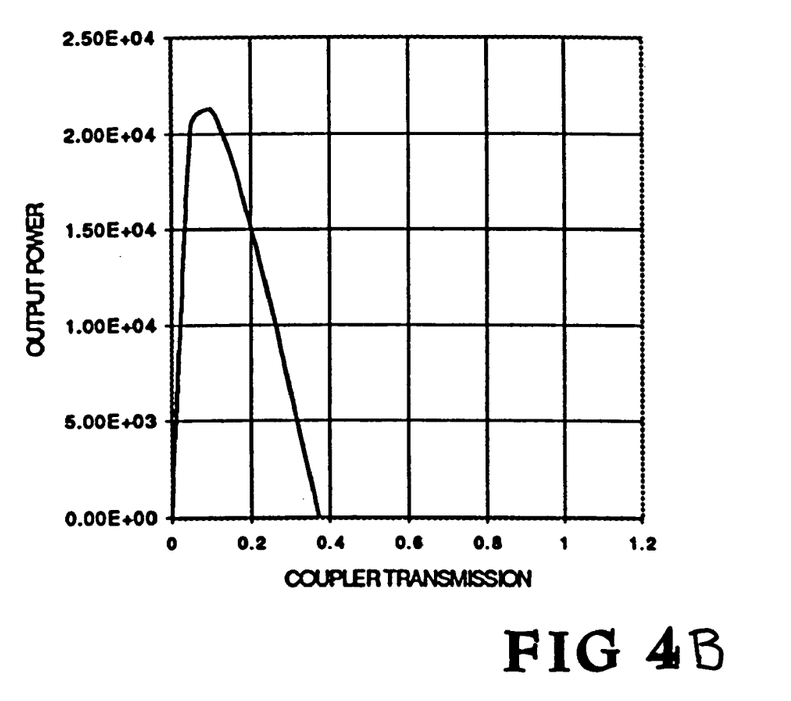
FIG. 4B is a graph of output coupler dependence.
Figure 4C:
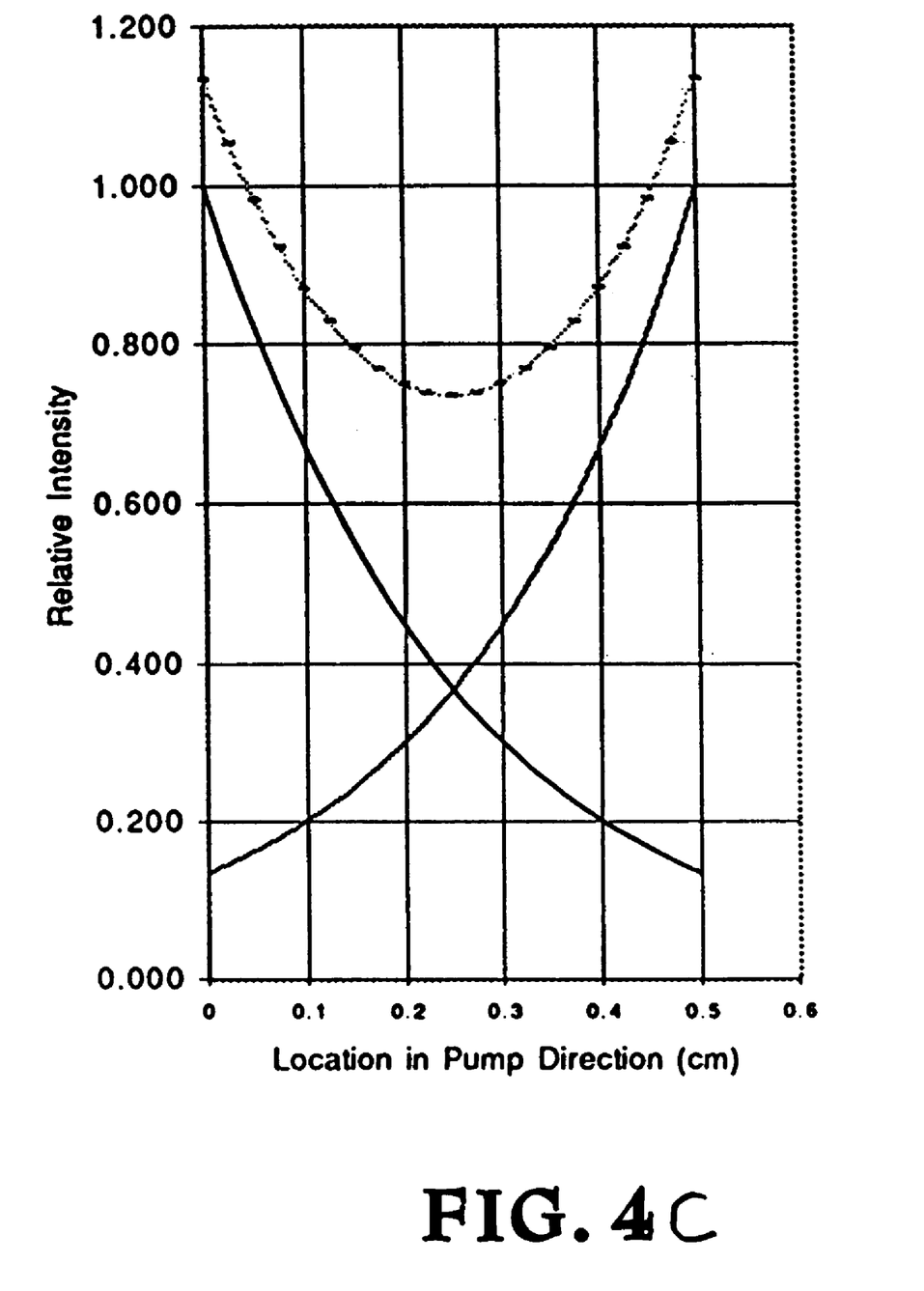
FIG. 4C is a graph of relative pump light intensity.

The laser is modeled in FIGS. 4A, 4B and 4C. This tells us what parameters must be included and what performance to expect depending on assumptions. The model was developed for the Nd liquid lasers. This is a simple spread sheet model based on Koechner's cw four level oscillator and includes the temperature rise of the liquid and the flow requirements.

A solution to the steady state power oscillator in terms of system efficiencies and fundamental optical parameters is used, including the following:

$$P_{out} = \eta_{slope}(P_{in} - P_{TH}) \text{ and}$$

$$P_{TH} = (T+L)AI_{sat}/(\eta_{pump}\eta_{trans}\eta_{abs}\eta_{upper}\eta_{beam}),$$

where $P_{in}$ the input electrical power to the pump source, $\eta_{slope}$ is the slope efficiency, $I_{sat}$, is the saturation intensity, and A is the cross sectional area of the gain media. The slope efficiency is a cascade of practical efficiencies and is defined by, $$\eta_{slope} = (T/(T-L))\eta_{pump}\eta_{trans}\eta_{abs}\eta_{upper}\eta_{beam}$$

$\eta_{pump}$ is the efficiency with which the pump source converts electricity into photons $\eta_{trans}$ is the pump light transport efficiency $\eta_{abs}$ is the absorption fraction of the pump energy $\eta_{upper}$ is the product of the quantum efficiency and the pump to laser Stokes loss $\eta_{beam}$ is the factor that accounts for the light distribution across the laser beam.

T and L are the output coupler and internal cavity losses.

Referring again to FIGS. 4A, 4B and 4C spread sheet models are shown that allows parameters to be varied using the above formulation. FIG. 4A shows laser performance, FIG. 4B shows output coupler dependence, and FIG. 4C shows relative pump light intensity. Using an excited state lifetime of 10 $\eta$sec, 808 nm diode pump light, and estimating the stimulated emission cross section to be $1.7 \times 10^{-19}$ $cm^2$, an output power of 20 kW can be obtained with about 70 kW of diode power. The model assumes a simple resonator to estimate the energetics. In practice an unstable resonator would be used for beam quality reasons.

In estimating the stimulated emission cross section either a Lorentzian or Gaussian line shape centered at the peak emission wavelength was assumed. Either choice gives about the same result. Then following Verdeyen's treatment on page 154 of his book "*Laser Electronics*" for a homogeneous broadened transition, the cross section depends only on the line shape factor and the Einstein A coefficient. Using the width of the fluorescence curve for $Ti^{+3}$ in glass (200 nm) and the transition rate of $10^5$ per second, also for glass, the value of $1.7 \times 10^{-19}$ $cm^2$ is obtained. Using the same procedure with values of fluorescence width and lifetime published for Ti:Sapphire gives $3.75 \times 10^{-19}$ $cm^2$, in reasonable agreement with the published polarization dependent values of $2-4 \; 10^{-19}$ $cm^2$.

It is believed that enough $Ti^{+3}$ can be put into solution to achieve the pump absorptance assumed, 4 $cm^{-1}$, without leaving too much $Ti^{+4}$ around to form complexes with $Ti^{+3}$ giving rise to absorption at the laser wavelength. This was a common problem in early Ti:Sapphire lasers. It is further believed that this much $Ti^{+3}$ can actually be put into solution. Lattice considerations and solubility limits the dissolution of metal compounds in crystals and glasses. Again from the literature on glass, pump absorption of around 0.5 $cm^{-1}$ at 808 nm for a doping concentration of 0.25% are reported. A value ten times larger to get the deposited pump power high enough to get well over threshold is believed. This corresponds to 2.5 weight percent dissolved in the liquid. Concentrations exceeding one mole per liter of $NdCl_3$ in $SeOCl_2$ have been demonstrated. This is 16 weight percent or 6.4 times the proposed doping.

Other features of the model dealing with thermal management are similar to the neodymium lasers. Input powers are somewhat larger due to the lower projected stimulated cross section and shorter lifetime. Two cells are used with opposite flow directions to cancel the linear optical wedge induced by waste heat in the fluid. The projected phase error of the output beam is about 0.4 waves peak to peak after correction with a single actuator deformable mirror.

What is claimed is:

1. A laser, comprising:
   a laser cavity having
   a first lasing chamber,
   a second lasing chamber,
   trivalent titanium ions dissolved in a liquid host within said first lasing chamber,
   trivalent titanium ions dissolved in a liquid host within said second lasing chamber,
   a first semiconductor pumping device operatively connected to said first lasing chamber for optically exciting said trivalent titanium ions dissolved in said liquid host within said first lasing chamber, said first semiconductor pumping device comprising at least one semiconductor diode for optically exciting said trivalent titanium ions dissolved in said liquid host within said first lasing chamber,
   a second semiconductor pumping device operatively connected to said second lasing chamber for optically exciting said trivalent titanium ions dissolved in said liquid host within said second lasing chamber, said second semiconductor pumping device comprising at least one semiconductor diode for optically exciting said trivalent titanium ions dissolved in said liquid host within said lasing second chamber,
   a closed loop circulation system for circulating said trivalent titanium ions dissolved in a liquid host through said first lasing chamber in a first linear direction into said closed loop circulation system and into said second lasing chamber and through said second lasing chamber in a second linear direction into said closed loop circulation system and back into said first lasing chamber, said second linear direction being opposite to said first linear direction, said closed loop circulation system comprising
   a first portion for circulating said trivalent titanium ions dissolved in a liquid host into and out of said first lasing chamber in said first linear direction and
   a second portion for circulating said trivalent titanium ions dissolved in a liquid host into and out of said second lasing chamber in said second direction that is opposite to said first linear direction.

2. The laser of claim 1 wherein said closed loop circulation system for circulating said trivalent titanium ions dissolved in a liquid host includes a pump and a heat exchanger.

3. The laser of claim 1, wherein thermally induced optical phase errors are produced by said a closed loop circulation system for circulating said trivalent titanium ions dissolved in a liquid host and wherein said first portion for circulating said trivalent titanium ions dissolved in a liquid host into and out of said lasing chamber in a first direction and said second portion for circulating said trivalent titanium ions dissolved in a liquid host into and out said lasing chamber in a second direction that is opposite to said first direction provides a system for correcting said thermally induced optical phase errors.

4. The laser system of claim 3, wherein said first portion for circulating said trivalent titanium ions dissolved in a liquid host includes a first flow channel and said second portion for circulating said trivalent titanium ions dissolved in a liquid host includes a second flow channel, said first flow channel and said second flow channel being of substantially equal length.

5. A laser system, comprising:
   an optical cavity having
   a first lasing chamber and
   a second lasing chamber,
   a lasing liquid containing trivalent titanium ions dissolved in a liquid host within said first lasing chamber and said second lasing chamber,
   a first semiconductor pumping device operatively connected to said first lasing chamber for optically exciting said trivalent titanium ions dissolved in a liquid host within said first lasing chamber, said first semiconductor pumping device comprising at least one semiconductor diode for optically exciting said trivalent titanium ions in the 800 to 900 nm region,
   a second semiconductor pumping device operatively connected to said second lasing chamber for optically exciting said trivalent titanium ions dissolved in a liquid host within said second lasing chamber, said second semiconductor pumping device comprising at least one semiconductor diode for optically exciting said trivalent titanium ions in the 800 to 900 nm region,
   a closed loop circulation system for circulating said trivalent titanium ions dissolved in a liquid host, said closed loop circulation system comprising
   a first portion for circulating said lasing liquid containing trivalent titanium ions dissolved in a liquid host into and out of said first lasing chamber in a first direction, and
   a second-portion for circulating said lasing liquid containing trivalent titanium ions dissolved in a liquid host into and out of said second lasing chamber in a second direction that is opposite to said first direction, said closed loop circulation system including a pump and a heat exchanger.

* * * * *